Patented Jan. 12, 1926.

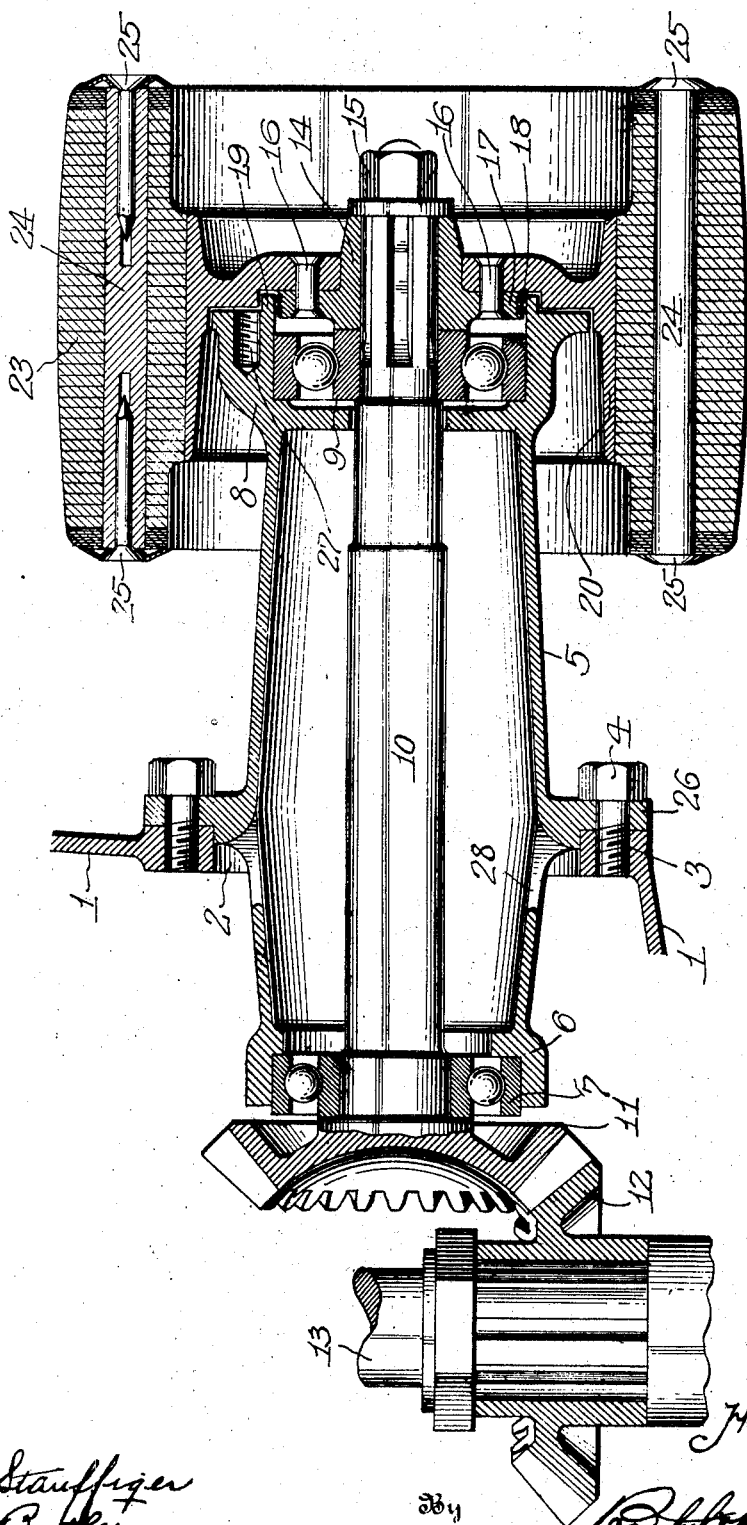

1,569,081

UNITED STATES PATENT OFFICE.

HENRY FORD, OF DEARBORN, MICHIGAN.

PULLEY FOR TRACTORS.

Application filed March 26, 1919. Serial No. 285,255.

*To all whom it may concern:*

Be it known that I, HENRY FORD, a citizen of the United States of America, residing at Dearborn, in the county of Wayne and State of Michigan, have invented certain new and useful Improvements in Pulleys for Tractors, of which the following is a specification, reference being had therein to the accompanying drawings.

The transmission mechanism of my tractor includes a power transmission shaft and a beveled gear wheel, both of which have been referred to in my pending application for a transmission mechanism filed July 27th, 1918, Serial No. 225,222, and in the specification that accompanies this application I refer to said gear wheel as being utilized for operating a pulley exteriorly of the transmission housing and said pulley employed for operating farm machinery while the tractor is stationary.

This application is directed to the construction of a supporting bearing for the pulley and the manner of installing the bearing. The supporting bearing is in the form of an attachment that may be easily and quickly installed when work is to be performed with the tractor stationary, or it may remain as a part of the tractor during field operation, so that the pulley may be used somewhat as a winch should occasion require. Provision is also made so that the pulley bearing may remain a fixture relative to the transmission housing and the pulley removed and a cap or closure plate substituted therefor. Such a constructive arrangement of parts will be hereinafter referred to and reference will now be had to the drawing, wherein there is shown a longitudinal sectional view of the pulley bearing attachment.

As identifying the location of the pulley attachment now in use on tractors, there is illustrated a portion of a transmission housing which includes a wall 1 provided with an opening 2 and adjacent the marginal edges of said opening there are a plurality of interiorly screwthreaded openings 3. The openings 3 accommodate screw bolts 4 and these bolts are adapted to retain the peripheral flange 26 of a hollow and somewhat cylindrical bearing 5 in engagement with the wall of the transmission housing. The screw bolts 4 may also be utilized for retaining a cap or closure plate over the opening 2 when the bearing 5 is not in place.

The bearing 5 is disposed concentrically of the opening 2 with the greater part thereof protruding from said opening and the inner end of said bearing terminates in a crown or bell end 6 supporting an antifrictional bearing 7 preferably of the ball type. The outer end of the bearing 5 terminates in a crown or bell end 8 somewhat larger than the bell end 6 and this outer end of the bearing supports an anti-frictional bearing 9, also of the ball type. The bearing 9 cooperates with the bearing 7 in supporting a pulley shaft 10 longitudinally of the bearing 5, said pulley shaft being gradually stepped in diameter from the inner end thereof to the outer end. On the inner end of the pulley shaft is a beveled gear wheel 11 meshing with a beveled gear wheel 12 mounted on a power transmission shaft 13, said beveled gear wheel 12 of the shaft 13 having been heretofore referred to as part of the transmission mechanism disclosed in my pending application Serial No. 227,222.

The outer end of the pulley shaft 10 is formed to permit of a pulley hub 14 being detachably mounted thereon, and, as shown, the pulley hub may be held for rotation with the pulley shaft by splines, keys or similar fastening means associated with a nut 15 mounted on the end of the pulley shaft.

The pulley hub 14 is preferably made in two parts riveted or otherwise connected together, as at 16, and the inner or shaft engaging part has a rivet receiving flange 17 with the periphery thereof provided with dust guards 18, packing rings or dust excluding elements that engage the inner annular wall 19 of bell end 8 of the bearing 5, thereby preventing dust and foreign matter from interfering with the function of the bearing 9 supporting the shaft 10 relative to the bearing 5.

The pulley and its hub may be of any well known type, but as illustrating a preferred form there is an outer pulley part which provides clearance for the wall 19 and also provides an inner rim 20 surrounding the outer rim of the bearing 5. The periphery of the rim 20 is formed to support a laminated pulley body 23, which is fabricated from a plurality of closely assembled flat rings mounted on a plurality of longitudinal members 24 and retained thereon by nails 25 or other fastening means mounted in the ends of the members 24. It is therefore possible to fabricate the pulley body from wood, leather or a suitable material to provide a belt contacting surface which will tend to increase the longevity of a belt or other power transmission member trained over the pulley. In constructing the laminations for the pulley body, it is also possible to shape the periphery of each ring or lamination so as to provide a pulley periphery of desired contour, for instance, somewhat convex as shown.

The outer end of the bearing 5 may be provided with interiorly screwthreaded sockets 27 and when the pulley, per se, is removed, the outer end of the bearing 5 may be closed by a cap or closure plate (not shown). The inner end of the bearing 5, contiguous to the flange 26 has openings 28 so that the lubricant from the transmission housing may enter the bearing 5 and lubricate the bearings 7 and 9 therein, or the pulley attachment may be lubricated by any well known system of lubrication.

What I claim is:—

In a pulley attachment for a tractor forward of the rear axle assembly and independent thereof, which tractor includes a transmission housing containing a power take-off gear in spaced relation to the housing wall, and a pulley adapted to be supported outside of the housing and driven by a shaft from said power take-off gear, a bearing casing for said shaft solely supported from said transmission housing, said bearing casing having an intermediate peripheral flange attached to said housing wall and long and short portions with the short portion extending into the housing and provided with lubricant receiving openings adjacent said flange, and the long portion of said bearing casing protruding from the housing wall, the long portion of said casing being proportioned so that any torsion of said shaft is transmitted to the ends of said bearing casing and from there to said housing to prevent binding at said take-off gear, anti-frictional bearings in the extreme ends of said bearing casing, said bearing casing and said anti-frictional bearings solely supporting said shaft and affording a lubricant chamber communicating with the interior of said transmission housing by virtue of the openings in said bearing casing adjacent said flange.

In testimony whereof I affix my signature.

HENRY FORD.